(12) United States Patent
Chen et al.

(10) Patent No.: US 7,596,596 B2
(45) Date of Patent: Sep. 29, 2009

(54) CHAT MARKING AND SYNCHRONIZATION

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 10/875,881

(22) Filed: Jun. 24, 2004

(65) Prior Publication Data

US 2005/0289220 A1    Dec. 29, 2005

(51) Int. Cl.
G06F 15/16    (2006.01)
G06F 3/00    (2006.01)

(52) U.S. Cl. ...................... 709/204; 715/758
(58) Field of Classification Search ................. 715/758; 709/204

See application file for complete search history.

(56) References Cited

U.S. PATENT DOCUMENTS

| | | | |
|---|---|---|---|
| 6,301,609 B1 | 10/2001 | Aravamudan et al. | 709/207 |
| 6,532,218 B1* | 3/2003 | Shaffer et al. | 370/260 |
| 6,651,086 B1 | 11/2003 | Manber et al. | 709/205 |
| 6,760,749 B1* | 7/2004 | Dunlap et al. | 709/204 |
| 7,191,400 B1* | 3/2007 | Buvac et al. | 715/205 |
| 7,263,526 B1* | 8/2007 | Busey et al. | 707/102 |
| 7,328,214 B2* | 2/2008 | Yuan et al. | 707/10 |
| 2002/0035605 A1 | 3/2002 | McDowell et al. | 709/206 |
| 2002/0112004 A1* | 8/2002 | Reid et al. | 709/205 |
| 2002/0120939 A1* | 8/2002 | Wall et al. | 725/87 |
| 2002/0178246 A1 | 11/2002 | Mayer | 707/10 |
| 2003/0034999 A1* | 2/2003 | Coughlin et al. | 345/738 |
| 2004/0002049 A1* | 1/2004 | Beavers et al. | 434/350 |
| 2004/0037406 A1 | 2/2004 | Gourraud | 379/202.01 |
| 2004/0243922 A1* | 12/2004 | Sirota et al. | 715/500 |
| 2005/0024387 A1* | 2/2005 | Ratnakar et al. | 345/629 |
| 2005/0097470 A1* | 5/2005 | Dias et al. | 715/723 |
| 2005/0102361 A1* | 5/2005 | Winjum et al. | 709/206 |
| 2005/0108332 A1* | 5/2005 | Vaschillo et al. | 709/206 |

* cited by examiner

Primary Examiner—Jeffrey Pwu
Assistant Examiner—Willow Noonan
(74) Attorney, Agent, or Firm—Yee & Associates, P.C.; David A. Mims, Jr.; Rudolf O. Siegesmund

(57) ABSTRACT

The invention is a demand-based messaging system that enables a user to mark any location in a message and share the mark with a second user. The invention comprises a messaging program operable on a plurality of computers connected by one or more communications media. The program configures a first computer to accept message data, including markers and links, from a user. A marker identifies a specific location within message data, and a link refers to a specific marker within message data. The program further configures the first computer to transfer message data to a second computer. The program further configures the second computer to display the message data as it is received, and to synchronize the display with a marker when a user activates a link that refers to the marker.

2 Claims, 5 Drawing Sheets

CHAT MARKING AND SYNCHRONIZATION

CROSS-REFERENCE TO RELATED APPLICATION

The present invention is related to the subject matter of U.S. patent application Ser. No. 10/824,811, incorporated herein by reference.

FIELD OF THE INVENTION

The present invention is a process for using electrical computers or data processing machines to transfer data via one or more communications media. In particular, the present invention comprises an improved demand-based messaging system that enables instant message marking and synchronization.

BACKGROUND OF THE INVENTION

Demand-based messaging is a communication service that allows users to exchange message data, such as text, over a network or other communications media, in real time. Probably the most common medium for exchange is the Internet, but as wireless phone networks continue to expand, their popularity for text messaging is also expanding. U.S. Pat. No. 6,301,609 issued to Aravamudun et al. and U.S. patent application Ser. No. 2002/0035605, for example, illustrate the move toward an exchange medium that unifies traditional and wireless communications. Instant messaging (IM) is perhaps the most widely known and used embodiment of demand-based messaging. Today, most network and online service providers offer some form of IM service. IM sessions (colloquially referred to as "chats") are often lengthy, with multiple participants each taking many turns "speaking" in the chat window.

IM users typically use a networked computer and IM client software to exchange messages with one another in conversational style. An IM client provides an interface for users to compose, send, receive, and read text messages. Examples of IM clients that are popular today include IBM's SameTime, MSN Messenger, and Yahoo/AOL Instant Messenger. Web-based interfaces are also gaining popularity, as illustrated in U.S. Pat. No. 6,651,086 issued to Manber et al., which describes how a user can join conversations about topics that are presented as web content.

In a graphical display, an IM client usually includes at least two windows: a window for composing and sending messages, and a window for displaying messages as users take turns sending and receiving them. It is common for one user to have multiple IM chats running simultaneously, usually in separate windows. Chats may include simple information shared by two workers scheduling a meeting, or they may contain complex discussions regarding proprietary information and critical decisions that keep a project moving forward. Chats also may contain a high degree of historical data and proprietary knowledge that is useful not only to the participants, but to other people within the organization that did not participate in the chat.

Chat transcripts frequently reveal that users spend at least some portion of a chat trying to locate specific statements already made in the current chat, or perhaps in a prior chat. Alternatively, IM users may engage simultaneously in a chat and a phone conversation, and the phone conversation may turn to locating and sharing chat information. U.S. patent application Ser. No. 2004/0037406, for example, discloses a method and system for distributing instant messages to conference call participants. IM users often need to refer back to information that they have sent already in one or more prior messages. Just as often, IM users need to share that information with other users (perhaps in other chats).

Current IM implementations fail to address adequately this need to locate and share chat information. Consequently, current IM users must scroll through chat windows (which may be hundreds of lines long) or use the IM client's limited search capability to find specific information. Either of these techniques for locating specific information can prove difficult, cumbersome, and time-consuming. Furthermore, both techniques lack the precision necessary to avoid misunderstandings about specific references. For example, if one user desires to share a specific portion of a chat with other users, then that user must describe the location precisely, or the other users must search for the location, or both. If the users want to confirm that they have located the correct information, then they must describe the information they found. Without that confirmation, there is no certainty that the users have accurately communicated the location of the chat. Additional problems arise when users have different size chat windows, or have joined chats at different points. Clearly, the known solutions to sharing chat information create communication ambiguities and divert conversational resources from intended topics.

Thus, there is a need to advance the state of the art of instant messaging to overcome the current shortcomings inherent in sharing chat information. In particular, IM users need an effective means for referring to and sharing specific information. The ideal IM solution will enable an IM user to mark a specific location within an instant message, share the message mark with another user, and synchronize a chat window with the message mark.

These and other objects of the invention will be apparent to those skilled in the art from the following detailed description of a preferred embodiment of the invention.

SUMMARY OF THE INVENTION

The invention disclosed herein is a demand-based messaging system that enables a user to mark any location in a message and share the mark with a second user.

The inventive demand-based messaging system comprises a messaging program operable on a plurality of electrical computers or data processing machines connected by one or more communications media. The messaging program comprises a message composer program, a message transport program, and a message reader program.

The message composer program configures each computer to accept message data, including markers and links, from a user. A marker identifies a specific location within message data, and a link refers to a specific marker within a message. The preferred embodiment of the message composer program further configures each computer to insert a marker at the beginning of the message data, without a user's explicit request.

The message transport program configures each computer to send message data over the communications media to other computers, and to receive message data sent by other computers over the communication media.

The message reader program configures each computer to display message data, including markers and links, as the message transport program receives it. The preferred embodiment of the message reader program further configures each computer to accept a request from a user to synchronize the display with a marker, and to respond to such a request by displaying the marker and surrounding message data.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention. As used herein, the term "computer" includes, without limitation, any machine that is capable of processing data and performing logic operations according to a predefined set of instructions.

Figure 1:
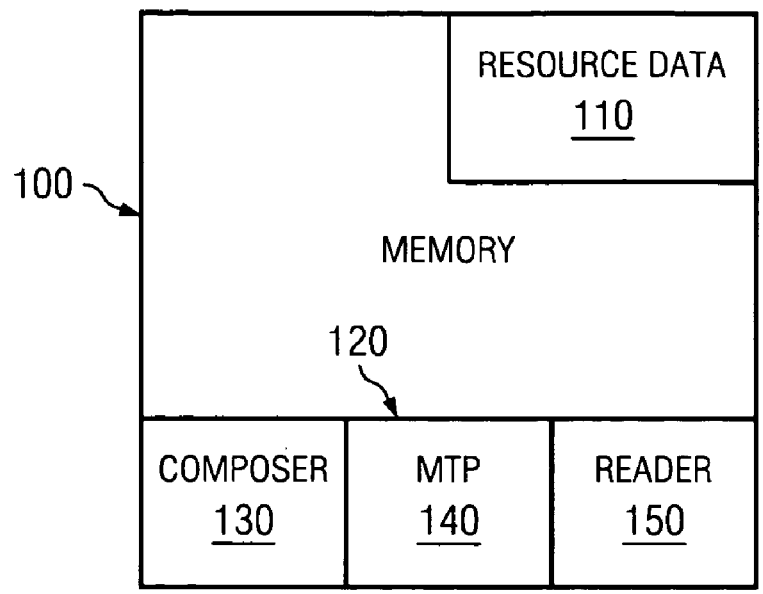
FIG. 1 illustrates the internal configuration of a computer having the computer program of the present invention loaded into memory.

The internal configuration of a computer, including connection and orientation of the processor, memory, and input/output devices, is well known in the art. FIG. 1 represents the internal configuration of a computer having the computer program of the present invention loaded into memory 100. The computer program of the present invention is depicted as messaging program 120, which comprises message composer program ("Composer") 130, message transport program (MTP) 140, and message reader program ("Reader") 150. Memory 100 is only illustrative of memory within a computer and is not meant as a limitation. Memory 100 also contains resource data 110. The present invention may interface with resource data 110 through memory 100.

In alternative embodiments, messaging program 120 and its components can be stored in the memory of other computers. Storing messaging program 120 in the memory of other computers allows the processor workload to be distributed across a plurality of processors instead of a single processor. Further configurations of messaging program 120 across various multiple memories and processors are known by persons skilled in the art.

Figure 2:
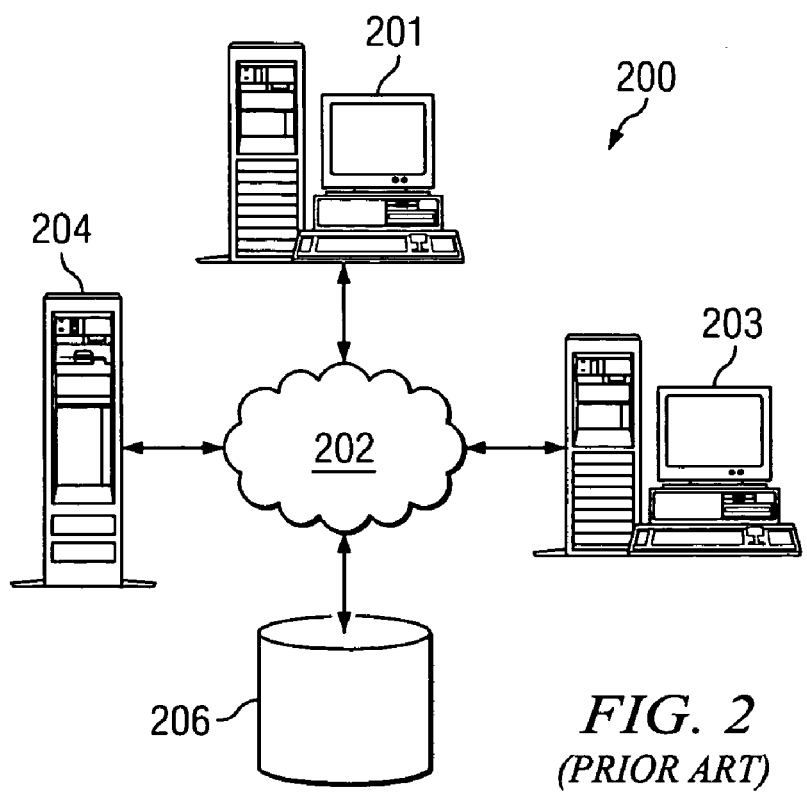
FIG. 2 illustrates a prior art architecture for connecting various hardware devices to create a network for transferring data.

FIG. 2 illustrates a common prior art architecture for connecting various hardware devices to create a network for transferring data. Computer network 200 comprises local workstation 201 electrically coupled to network connection 202. In FIG. 2, local workstation 201 is coupled electrically to remote workstation 203 via network connection 202. Local workstation 201 also is coupled electrically to server 204 and persistent storage 206 via network connection 202. Network connection 202 may be a simple local area network (LAN) or may be a larger wide area network (WAN), such as the Internet. While computer network 200 depicted in FIG. 2 is intended to represent a possible network architecture, it is not intended to represent an architectural limitation.

Messaging program 120 described herein can be stored within memory 100 of any workstation or server depicted in FIG. 2. Alternatively, messaging program 120 can be stored in an external storage device such as persistent storage 106, or a removable disk such as a CD-ROM not pictured). Additionally, messaging program 120, as described in detail below, is generally loaded into the memory of more than one computer of FIG. 2 to enable users on different computers to exchange messages over network connection 202.

Figure 3:
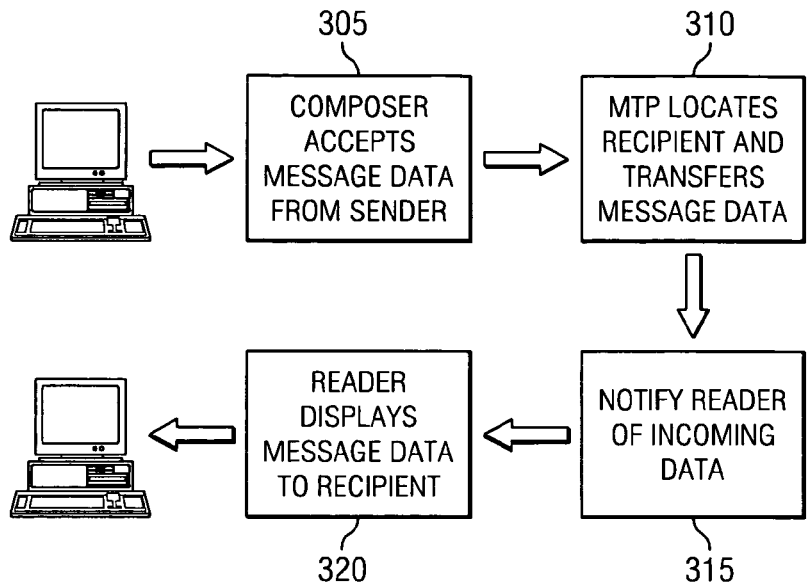
FIG. 3 provides a functional overview of the present invention.

FIG. 3 provides a functional overview of messaging program 120, as it interacts with a first user sending a message to a second user over a computer network. Messaging program 120 is loaded into the memory of both users' computers. Composer 130 accepts message data from the first user (305), and then, upon the first user's request, MTP 140 locates the second user's computer on the network and transfers the message data to the second user's computer (310). MTP 140 on the second user's computer then notifies Reader 150 of incoming message data (315), and Reader 150 displays the incoming message data to the second user (320). Alternatively, MTP 140 transfers the message data to a messaging server (not shown), and MTP 140 on the second user's computer retrieves the message data from the messaging server program. Those skilled in the art will appreciate that many similar functional variations are possible and not all are described here.

Figure 4:
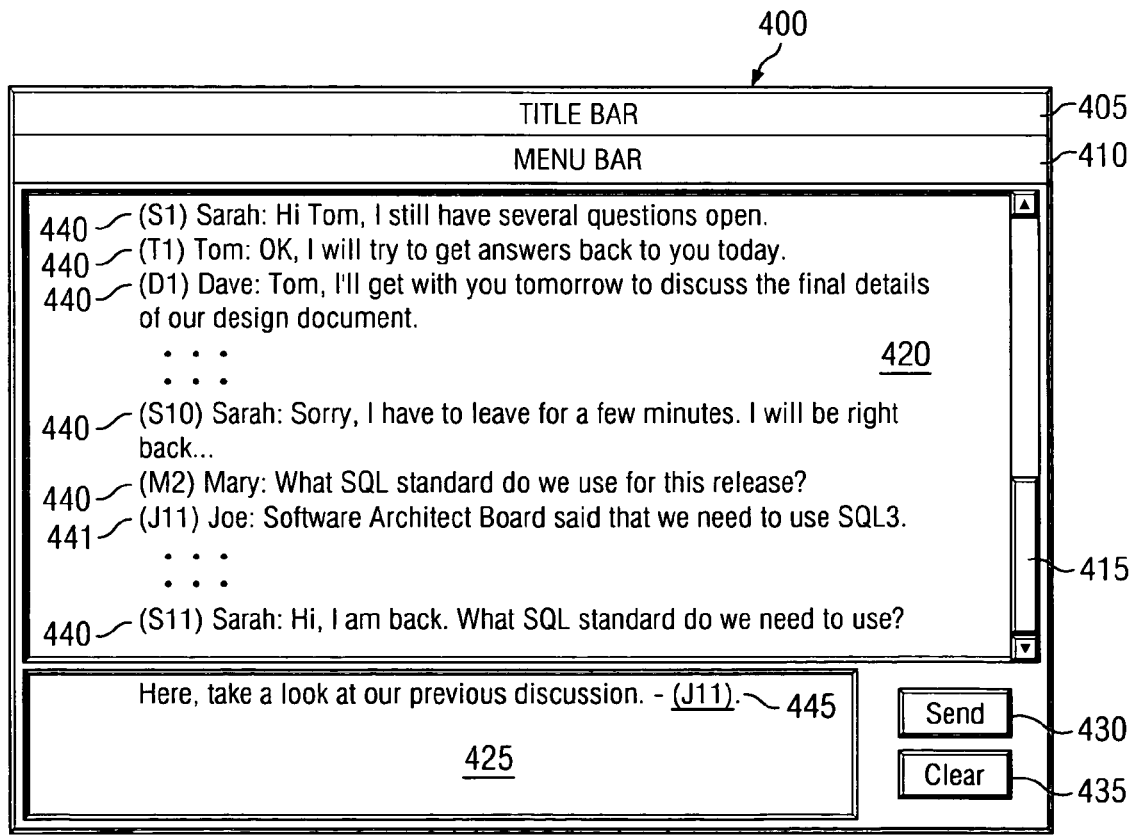
FIG. 4 illustrates an exemplar graphical user interface to the present invention.

FIG. 4 illustrates an exemplary graphical user interface (GUI) 400 to messaging program 120. GUI 400 comprises a combination of several prior art elements, along with several inventive elements. The prior art elements include title bar 405, menu bar 410, scroll bar 415, display window 420, input window 425, and control buttons 430 and 435. Display window 420 depicts a series of messages that users Sarah, Tom, Dave, Mary, and Joe have exchanged in a fictional instant messaging session. Input window 425 depicts a message that Joe has typed, but not sent, in response to Sarah's last message. The inventive elements in GUI 400 include message markers 440 and message link 445. As used herein, a "message marker" is any means of identifying a specific location within message data. A "location," as that term is used herein, includes without limitation any individual word, phrase, turn, or sub-turn. A "message link" is any means of identifying a specific marker within message data, and can be represented by text or graphic symbols including, without limitation, hypertext links or icons.

Composer 130 configures a computer to accept message data, including markers and links, from a user, and then to insert the markers and links into the message data as requested by the user. The preferred embodiment of Composer 130 further configures a computer to insert a marker at the beginning of the message data, without a user's explicit request, as depicted by each message marker 440 in FIG. 4. Each message marker 440 identifies a specific location within the series of messages, and in alternative embodiments, also may identify the message sender. Composer 130 preferably represents message marker 440 in a standard format, such as Extensible Markup Language (XML), but a person of skill in the art will appreciate that, in addition to or in the alternative, Composer 130 may use any format that Reader 150 can understand. In FIG. 4, each message marker 440 is visible in display window 420, but in general, message markers need not be visible to be usable. A message link identifies a specific marker within the series of messages. Exemplary message link 445 in FIG. 4 refers to message marker 441. In the preferred embodiment, a user may specify which message markers should be sent to which recipients, and a recipient likewise may choose to accept or reject any link to a message marker. As discussed in detail below, a recipient of message link 445 will be able to select the link in the recipient's display window, and Reader 150 will instantaneously display message marker 441 and the surrounding messages.

Composer 130 further configures a computer to accept transfer instructions from a user. Send button 430 in FIG. 4 is an exemplary interface that allows a user to instruct Composer 130 to transfer the message data in input window 425 to another computer. Thus, when a user activates send button 430, Composer 130 relays the instructions to MTP 140. MTP 140 configures a computer to send the message data over network connection 202 to other computers, and to receive message data sent by other computers over network connection 202.

MTP 140 transfers the message data over network connection 202 to one or more computers being used by one or more recipient users specified by the message sender. Once MTP 140 transfers the message data to the recipient user's computers, Reader 150 on each recipient's computer causes the computer to display the message data, including markers and links, as MTP 140 receives the data.

Figure 5:
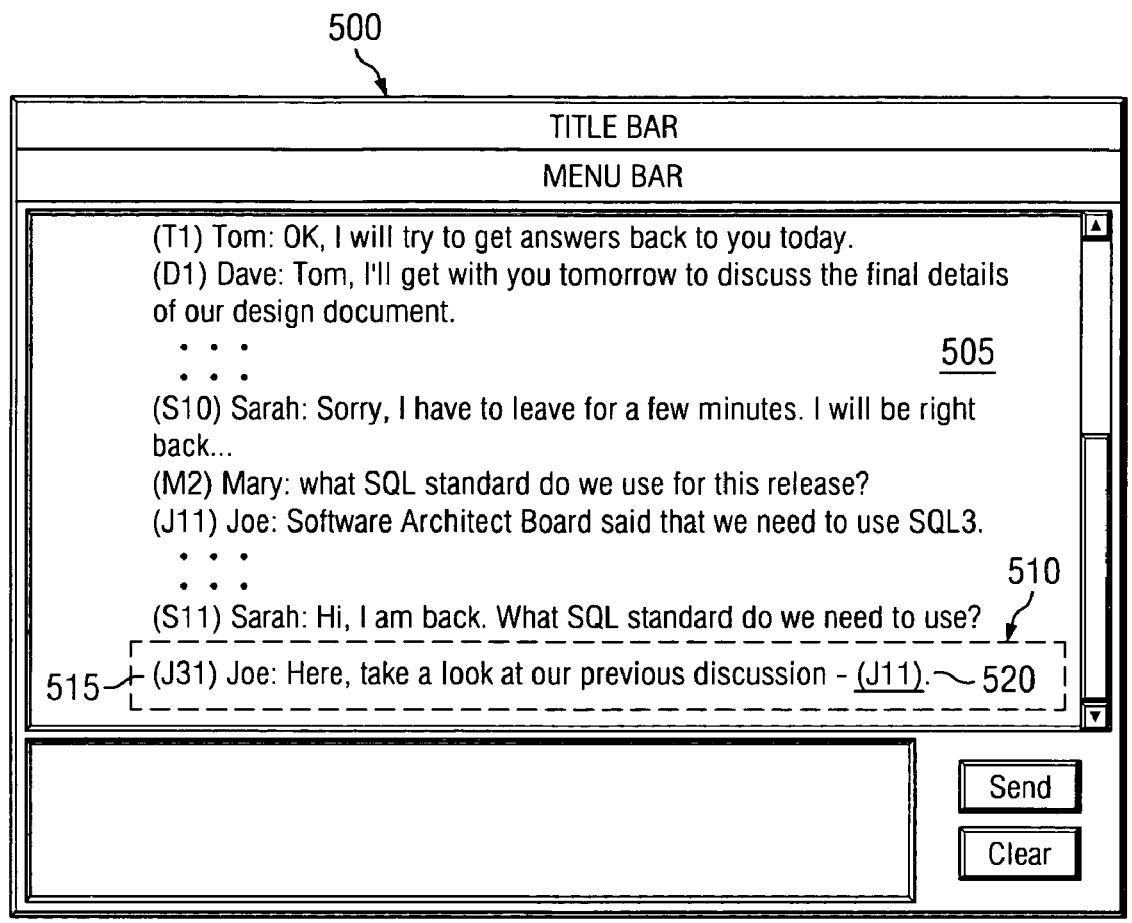
FIG. 5 illustrates an exemplar graphical user interface displayed on a recipient's computer after receiving a message with a link.
Figure 6:
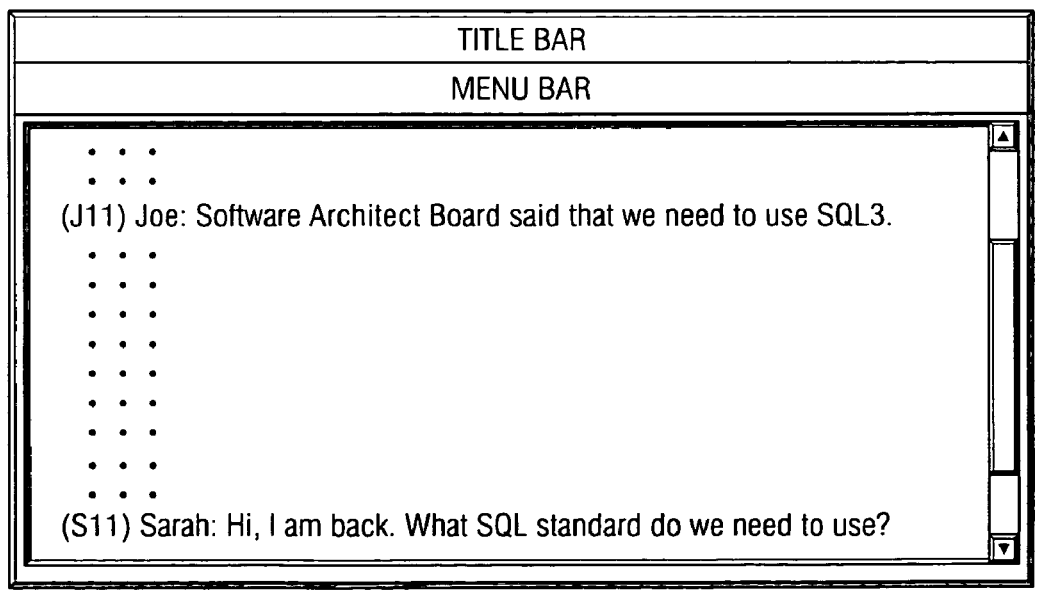
FIG. 6 illustrates an embodiment of a synchronized graphical user interface.
Figure 7:
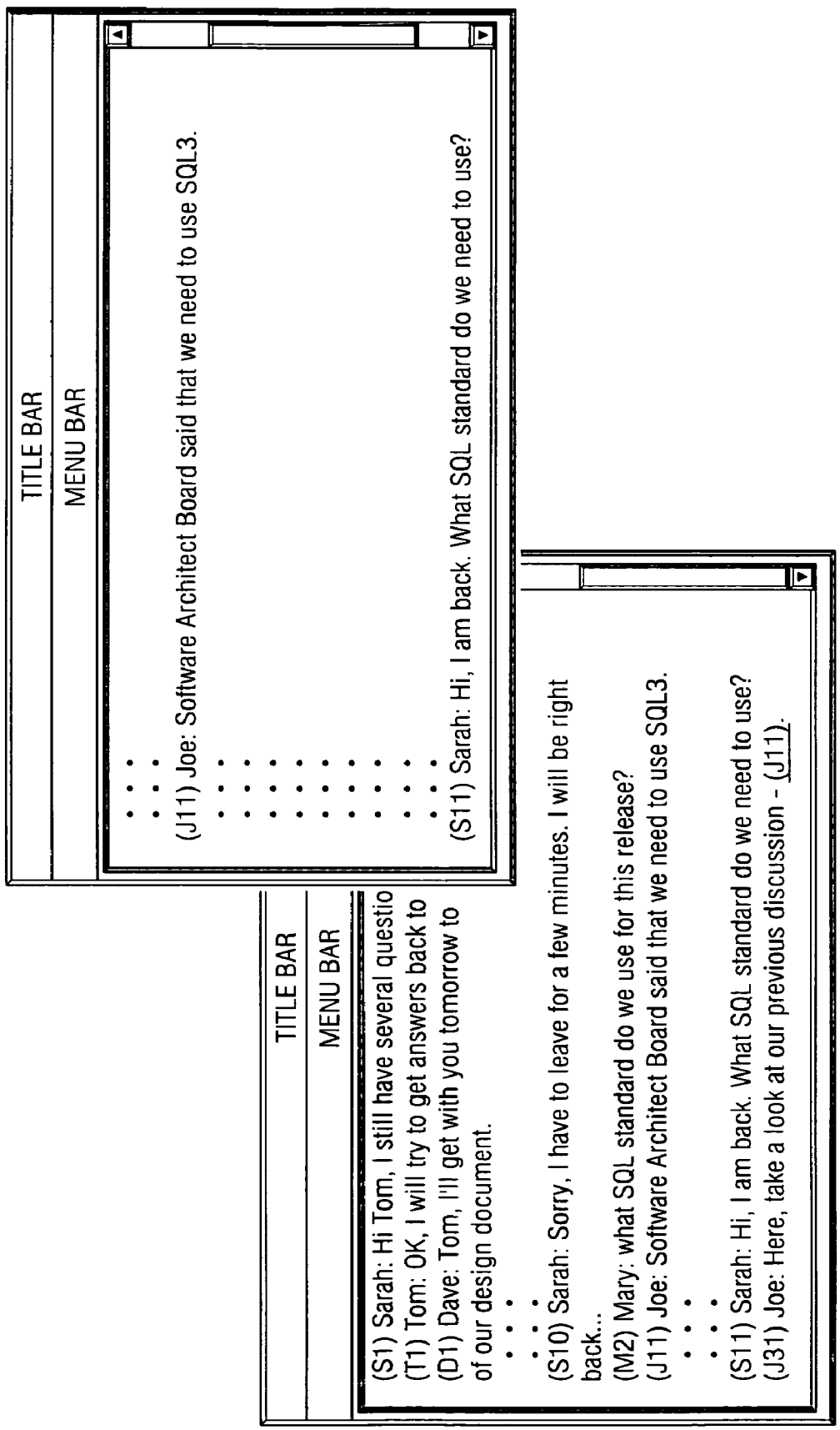
FIG. 7 illustrates an alternative embodiment of a synchronized graphical user interface.

FIG. 5 illustrates GUI 500 displayed by a recipient's computer after the user has sent the message in input window 425 of FIG. 4. As depicted in FIG. 5, GUI 500 comprises the same elements as GUI 400 in FIG. 4, but a person of skill in the art will appreciate that GUIs are highly customizable and may not be identical. The last line of display window 505 comprises message data 510, which includes message marker 515, and message link 520. When a user activates message link 520, Reader 150 synchronizes a display window with message marker 515. As used here, the term "synchronize" refers to the act of causing a display window to display a specific message marker in response to a user activating a message link that refers to the specific message marker. A display window may be synchronized with a message marker by either scrolling the active display window to a message marker or creating a new display window and scrolling the new display window to the message marker. Thus, in FIG. 5, Reader 150 causes display window 505 to display message marker 515 either as illustrated in FIG. 6 or as in FIG. 7.

FIG. 5 depicts a single message link, but a person of skill in the art will appreciate that a user may exchange multiple message links within the course of an IM session. Thus, in alternative embodiments, Reader 150 tracks each message link and displays a list of all message links for the user. The user can then choose to activate a message link from the displayed list. When a user activates a message link in the displayed list, Reader 150 synchronizes a display window with the corresponding message marker, substantially as described above. Alternatively, the user can configure Reader 150 to display the original message link in the display window. A person of skill in the art will appreciate that Reader 150 can further be configured to allow the user to sort such a list of message links by any available attributes.

Messaging program 120 optionally may configure a computer to save message data in a database or other repository, such as the repository system disclosed in U.S. patent application Ser. No. 10/824,811. Using such a repository system has the additional advantage of enabling links that refer to message markers from prior sessions or sessions with different users.

Figure 8:
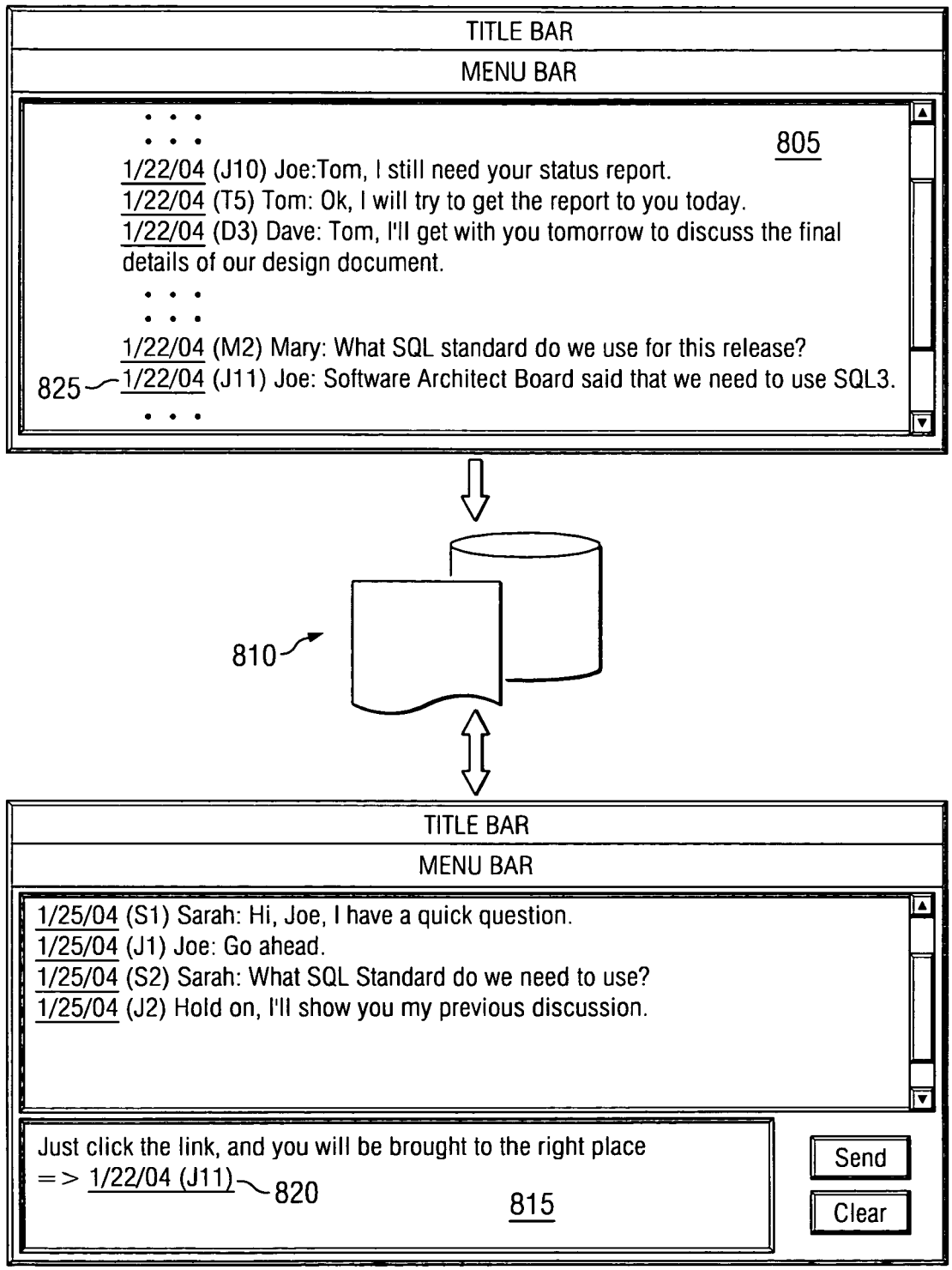
FIG. 8 illustrates the use of the present invention to link to prior messaging sessions or messaging sessions with other users.

In FIG. 8, for example, user Joe has exchanged messages with several other users on a previous occasion, as depicted in display window 805. Messaging program 120 has stored these messages in repository 810. User Sarah, who did not participate in the prior messaging session, now needs information that can be found in the prior messages. In input window 815, user Joe can insert message link 820 into a message that refers Sarah to message marker 825, which is stored in repository 810. Joe also can grant appropriate permissions, within message link 820, for Sarah to access message marker 825. Note that FIG. 8 illustrates Sarah initiating a new messaging session with user Joe and asking Joe a question, but a person of skill in the art will appreciate that Sarah could have called Joe to ask the question, and Joe could have initiated a messaging session with Sarah in order to insert message link 820. When user Sarah subsequently activates message link 820, Reader 150 locates the messaging session that contains message marker 825, and displays the message marker and associated messages as discussed above and illustrated in FIG. 6 and FIG. 7.

Alternative embodiments of the present invention include integrating message markers and message links with other conventional applications, including without limitation email clients, word processors, spreadsheet programs, file viewers, or web browsers. In such embodiments, Composer 130 configures a computer to accept message links from a user and then to insert the links into the application data, rather than message data. When a user activates a message link within the application, Reader 150 opens a new GUI to messaging program 120 and synchronizes the display window with the corresponding message marker.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method of sharing a marker with at least one participant in an electronic chat between a plurality of users, the method comprising:

at a first computer, displaying a chat input window to a first user on a first output device;

at a second computer, displaying a chat display window to a second user on a second output device;

responsive to the first user entering a first message into the chat input window, performing steps comprising:

entering a marker automatically at a specific location into the first message without a user request, and sending the first message to the second user;

responsive to the first user entering a second message into the chat input window and specifying the marker to send, performing steps comprising:

entering a link to the marker into the second message;

sending the second message containing the link to the marker to the second user, and displaying the second message in the second display window on the second output device;

responsive to the second user activating the link in the second message, performing steps comprising:

opening a third display window on the second output device; and displaying the specific location in the first message in the third display window;

wherein the specific location is an individual word, a phrase, a turn, or a sub-turn in the first message;

wherein the marker identifies the specific location and a sender of the message containing the specific location;

wherein all message data is saved to a repository so that linking one or more message markers from a plurality of different sessions with a plurality of different users is enabled; and wherein the marker and the third display window are synchronized by the marker.

2. The method of claim 1, further comprising:

at a third computer, displaying a fourth chat display window to a third user on a third output device;

storing the first message and the second message in a database;

at the first computer, the first user entering a third message into the chat input window, the third message comprising a second link referencing the first message, the second link further comprising a permission for the third user to access the first message;

displaying the third message in the fourth chat display window; and responsive to the third user activating the second link and to the permission, the third computer retrieving the first message from the database, opening a fifth chat display window on the third output device, scrolling the first message in the fifth display window to the marker so that the third user can view the marker and surrounding text and simultaneously view the third message in the third display window.

* * * * *

UNITED STATES PATENT AND TRADEMARK OFFICE
CERTIFICATE OF CORRECTION

PATENT NO. : 7,596,596 B2
APPLICATION NO. : 10/875881
DATED : September 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Twenty-eighth Day of September, 2010

David J. Kappos
*Director of the United States Patent and Trademark Office*